(No Model.)

W. T. COMSTOCK.
LEVELING INSTRUMENT.

No. 294,014. Patented Feb. 26, 1884.

WITNESSES:
Robert H. Roy
Wm. J. Bell

INVENTOR
William T. Comstock
BY
Frank v. Briesen
ATTORNEY

UNITED STATES PATENT OFFICE.

WILLIAM T. COMSTOCK, OF NEW YORK, N. Y.

LEVELING-INSTRUMENT.

SPECIFICATION forming part of Letters Patent No. 294,014, dated February 26, 1884.

Application filed January 14, 1884. (No model.)

*To all whom it may concern:*

Be it known that I, WILLIAM T. COMSTOCK, of the city of New York, in the county and State of New York, have invented a new and useful Improvement in Leveling-Instruments, of which the following specification is a full, clear, and exact description.

This invention relates to an improved leveling-instrument, which is designed more particularly to be used by builders and others who are not accustomed to handle the complicated field-instruments.

The invention has for its object, therefore, principally to simplify the construction of the level, so that its manipulation is facilitated.

The invention consists in the details of improvement, more particularly pointed out in the specification and claim.

Figure 1:
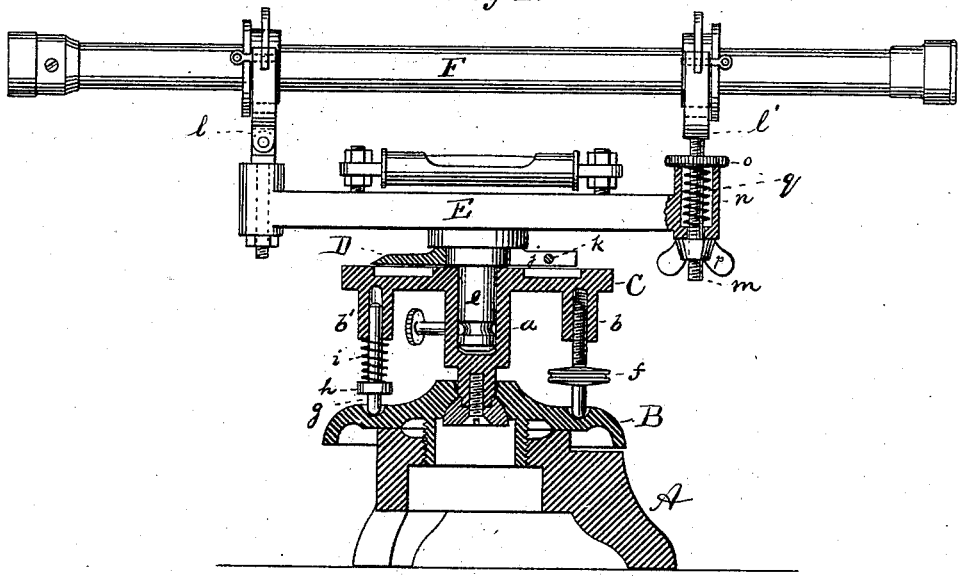
Figure 2:
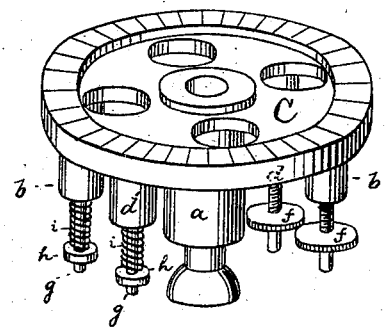
Figure 3:
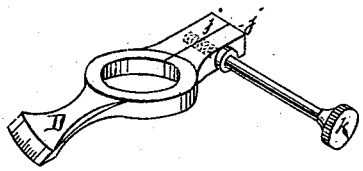

In the accompanying drawings, Figure 1 is a side elevation, partly in section, of my improved level. Fig. 2 is a detail perspective view of the lower graduated plate, and Fig. 3 a similar view of the upper graduated plate.

The letter A represents the tripod of my improved level, which level is also adapted to measure horizontal angles. To the tripod is tightly screwed the base-plate B, that supports, in manner hereinafter described, the lower graduated plate, C.

D is the upper graduated plate, and E the frame that carries the telescope F. The lower graduated plate, C, is cast in one piece with five downwardly-projecting sleeves, $a$, $b$, $b'$, $d$, and $d'$. The central sleeve, $a$, is hollow at the top to receive the central pin or stem, $e$, of the frame E, so that the same is free to turn therein. At the lower end the sleeve $a$ is by a ball-and-socket joint connected to plate B. The sleeves $b$ $b'$ $d$ $d'$, which are perforated from the bottom, contain the devices for leveling plate C upon the tripod. These consist of two thumb-screws, $ff$, which enter with their upper end the sleeves $b$ $d$, and rest with their lower end in a groove of base-plate B. Opposite each thumb-screw is inserted into the sleeve $b'$ $d'$ a pin, $g$, having a short distance above its lower end a shoulder, $h$. Between shoulder $h$ and lower edge of sleeves $b'$ $d'$ is a strong spiral spring, $i$, as shown.

By the use of this construction one thumb-screw only need be turned at the time, and the instrument will not become cramped, as occurs when four thumb-screws are used, and one is turned in the wrong direction. Moreover, by the use of the shoulders $h$ the springs $i$ will be clear of plate B, and will therefore not interfere with turning of graduated plate C on base-plate B. The upper graduated circle, D, I make in the form of a small index-finger, having on one side a scale and on the opposite side two spring-jaws, $jj$, preforated transversely to receive the end of a clamp-screw, $k$. At the center the plate D has a circular opening to straddle the stem $e$ of frame E. The clamp-screw $k$ serves as well for clamping the plate D to stem $e$ as a handle for turning said plate when not clamped. It projects with its free end beyond the circumference of plate C.

In order to adjust the telescope F in case it should not be entirely parallel with its supporting-frame E, I have devised the following construction. One of the Y-supports, $l$ of the telescope is hinged to the frame E, as shown, while the other Y-support, $l'$, rests upon one end of a screw-shank, $m$, that passes through a hollow arm, $n$, of frame E. On the upper and lower end of said screw-shank are the nuts $o$ $p$, as shown. A spiral spring, $q$, encircles the screw-shank within arm $n$, and bears with lower end against a shoulder of said arm, while with its upper end it bears against nut $o$.

In order to raise the telescope, the nut $p$ is first loosened, and the spring $q$ will then throw the screw-shank and the telescope up. The nut $o$ is then tightened down, so that the telescope is firmly held in place. For lowering the telescope, the nut $o$ is first loosened and then the nut $p$ is tightened.

My improved level is used as follows: To measure vertical distances, the plate C is first leveled by means of the thumb-screws $f$, and the level is then used in the customary manner. To measure horizontal angles, the zero of the upper plate, D, is brought opposite the zero of plate C, and then the plate D is clamped by means of screw $k$ tightly to stem $e$, so as to turn with the telescope. When the telescope is turned to the new sight, the zero on plate D will indicate on scale of plate C the size of the angle turned.

I prefer for simplicity to mark only whole angles on plate C and tenths of angles on the right and left of the zero of plate D. In this way tenths of angles may be conveniently read.

I claim as my invention—

1. The combination, in a level, of lower graduated plate, C, with base-plate B, and with thumb-screws $ff$ and pins $gg$, having shoulders $h$ and springs $i$, substantially as and for the purpose specified.

2. The combination, in a level, of a base plate, B, with the telescope-carrying frame E, and with two graduated plates, C D, the lower plate, C, made in one piece with the central sleeve, $a$, open on top, and with the sleeves $bb'$ $dd'$ open at the bottom, substantially as specified.

3. The combination of frame E, having hollow arm $n$, with the screw-shank $m$, nuts $op$, spring $q$, and with the supports $ll'$ and telescope F, substantially as specified.

WM. T. COMSTOCK.

Witnesses:
   J. T. OWEN,
   THOS. F. MCGLYNN.